(12) United States Patent
Noh et al.

(10) Patent No.: US 8,300,297 B2
(45) Date of Patent: Oct. 30, 2012

(54) ELECTROCHROMIC DEVICE AND METHOD OF FABRICATING THE SAME

(75) Inventors: Chang-Ho Noh, Suwon-si (KR); Seon-Mi Yoon, Yongin-si (KR); Jae-Young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 127 days.

(21) Appl. No.: 12/500,092

(22) Filed: Jul. 9, 2009

(65) Prior Publication Data

US 2010/0202035 A1    Aug. 12, 2010

(30) Foreign Application Priority Data

Feb. 11, 2009  (KR) .................. 10-2009-0010966

(51) Int. Cl.
*G02F 1/155* (2006.01)
*G02F 1/153* (2006.01)
(52) U.S. Cl. .................. 359/266; 359/267; 359/269
(58) Field of Classification Search .......... 359/265–267, 359/269–270, 273
See application file for complete search history.

(56) References Cited

U.S. PATENT DOCUMENTS

| 4,183,631 | A | * | 1/1980 | Kondo et al. | 359/269 |
| 4,508,432 | A | * | 4/1985 | Freller et al. | 359/266 |
| 2004/0257633 | A1 | * | 12/2004 | Agrawal et al. | 359/265 |
| 2007/0139756 | A1 | * | 6/2007 | Agrawal et al. | 359/265 |
| 2008/0055701 | A1 | * | 3/2008 | Liu et al. | 359/266 |
| 2008/0086876 | A1 | * | 4/2008 | Douglas | 29/846 |
| 2008/0264482 | A1 | * | 10/2008 | Lee et al. | 136/256 |
| 2009/0128882 | A1 | * | 5/2009 | Das et al. | 359/265 |
| 2009/0246625 | A1 | * | 10/2009 | Lu | 429/207 |

FOREIGN PATENT DOCUMENTS

| JP | 2008047450 | 2/2008 |
| JP | 2008177165 | 7/2008 |
| KR | 1020020030499 | 4/2002 |
| KR | 1020070025745 | 3/2007 |
| KR | 1020070032461 | 3/2007 |

* cited by examiner

*Primary Examiner* — Ricky Mack
*Assistant Examiner* — Mahidere Sahle
(74) *Attorney, Agent, or Firm* — Cantor Colburn LLP

(57) ABSTRACT

An electrochromic device includes a first substrate, a second substrate facing the first substrate, a first electrode disposed on the first substrate, a carbon nano-structured electrode layer disposed on the first electrode, a second electrode disposed on the second substrate, an electrochromic layer disposed on the second electrode, and an electrolyte layer interposed between the first substrate and the second substrate.

18 Claims, 5 Drawing Sheets

ELECTROCHROMIC DEVICE AND METHOD OF FABRICATING THE SAME

CROSS-REFERENCE TO RELATED APPLICATION

This application claims priority to Korean Patent Application No. 10-2009-0010966, filed on Feb. 11, 2009, and all the benefits accruing therefrom under 35 U.S.C. §119, the content of which in its entirety is herein incorporated by reference.

BACKGROUND

1) Field

The following description relates to an electrochromic device and a method of fabricating the same and, more particularly to an electrochromic device including a counter electrode easily fabricated at reduced temperatures and a method of fabricating the same.

2) Description of the Related Art

Electrochromism is a phenomenon in which a color reversibly changes based on a direction of an electric field formed by a voltage. Moreover, a material having electrochromic properties, e.g., a material having optical characteristics that reversibly change through an electrochemical reduction-oxidation ("redox") reaction, is called an electrochromic material. In general, an electrochromic material does not display a color until an electric field is applied thereto or, alternatively, the electrochromic material may display color when no electric field is applied thereto, and not display the color when an electric field is applied.

A typical electrochromic device utilizing the abovementioned electrochromic characteristics has excellent reflectivity, flexibility and portability, without requiring an external light source. More particularly, electrochromic devices are becoming increasingly popular for use in electronic paper. As a result, there is a need to develop an electronic medium, e.g., an electrochromic device, that can be easily manufactured to have a display quality substantially similar to that of printed paper.

SUMMARY

Exemplary embodiments provide an electrochromic device including a counter electrode that is easily fabricated at a low temperature, and a fabrication method thereof.

Exemplary embodiments also provide a method for fabricating an electrochromic device having substantially reduced production costs.

According to an exemplary embodiment, an electrochromic device includes a first substrate, a second substrate disposed opposite the first substrate, a first electrode disposed on the first substrate, a carbon nano-structured electrode layer disposed on the first electrode, a second electrode disposed on the second substrate, an electrochromic layer disposed on the second electrode, and an electrolyte layer interposed between the first substrate and the second substrate.

The carbon nano-structured electrode layer may include carbon nanotubes, graphene or any mixtures thereof. The carbon nano-structured electrode layer may have a transmission rate of about 50 percent (%) or higher, a porosity of about 10 volume % (volume percent) to about 90 volume %, and a thickness in from about 20 angstroms (Å) to about 2000 Å. A driving voltage of the electrochromic device may be from about 0.5 volts (V) to about 5.0 V. The driving voltage may be adjusted by controlling an ionization energy of the carbon nano-structured electrode layer. The electrochromic layer may include an electrochromic material disposed in a nano-structure, or may include a mixture of an electrochromic material and a polymer compound. The nano-structure may include nano-particles having a size from about 1 nanometer (nm) to about 100 nm.

The second electrode may include patterns corresponding to portions of a pixel. The carbon nano-structured electrode layer may be transparent.

The electrochromic device may further include a counter electrode disposed on the first electrode, and the counter electrode may include the carbon nano-structured electrode layer.

The carbon nano-structured electrode layer may be formed at a temperature of about 150 degrees Celsius (° C.) or less.

According to an alternative exemplary embodiment, a method for fabricating an electrochromic device including a first electrode and a second electrode facing the first electrode includes forming a carbon nano-structured electrode layer on the first electrode, forming an electrochromic layer on the second electrode, and forming an electrolyte layer between the first electrode and the second electrode.

The method may further include arraying and assembling the first electrode and the second electrode.

The forming the carbon nano-structured electrode layer may be performed at a temperature of about 150° C. or less.

A transmission rate of the carbon nano-structured electrode layer may be about 50% or greater.

The carbon nano-structured electrode layer may be transparent, a porosity of the carbon nano-structured electrode layer may be from about 10 volume % to about 90 volume %, and a thickness of the carbon nano-structured electrode layer may be from about 20 Å to about 2000 Å.

The method may further include forming a counter electrode on the first electrode, and the counter electrode may include the carbon nano-structured electrode layer.

The method may further include adjusting a driving voltage of the electrochromic device such that the driving voltage is from about 0.5 V to about 5.0 V.

BRIEF DESCRIPTION OF THE DRAWINGS

The above and other aspects, advantages and features of the present invention will become more apparent by describing in further detail exemplary embodiments thereof with reference to the accompanying drawings, in which.

DETAILED DESCRIPTION

Figure 1:
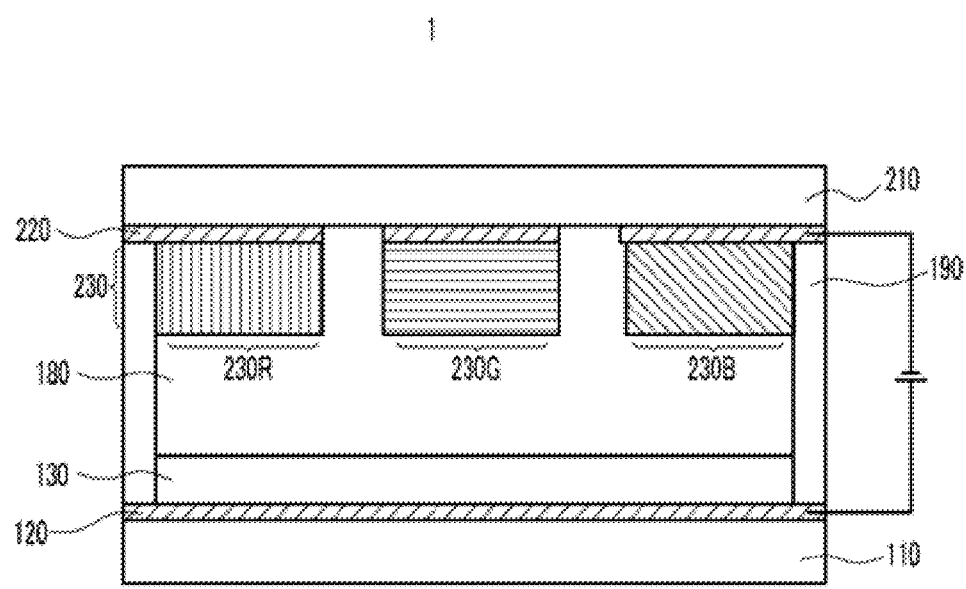
FIG. 1 is a cross-sectional view of an exemplary embodiment of an electrochromic device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrochromic device according to an exemplary embodiment will be described in further detail with reference to FIG. 1.

FIG. 1 is a cross-sectional view of an exemplary embodiment of an electrochromic device according to the present invention.

Referring to FIG. 1, an electrochromic device 1 according to an exemplary embodiment includes a first substrate 110, which may be formed of glass and/or plastics. The plastics may include, for example, polyethylene terephthalate, polyethylene naphthalate, polycarbonate, polyethersulfone, polyimide and/or transparent plastics such as glass fiber reinforced plastics, but alternative exemplary embodiments are not limited thereto.

A first electrode 120 is disposed on the first substrate 110. The first electrode 120 includes an inorganic and/or an organic conductive materials, and may be transparent. In an exemplary embodiment, the inorganic materials include indium tin oxide ("ITO"), indium zinc oxide ("IZO") and fluorine-doped tin oxide, whereas the organic materials include polythiophene and phenylpolyacetylene. It will be noted that alternative exemplary embodiments are not limited the above-listed materials.

A carbon nano-structured electrode layer 130 is disposed on the first electrode 120. In an exemplary embodiment, the carbon nano-structured electrode layer 130 is transparent, and includes carbon nanotubes or graphene. In an alternative exemplary embodiment, the carbon nano-structured electrode layer 130 may include a mixture of carbon nanotubes and graphene. Moreover, in an exemplary embodiment, the carbon nano-structured electrode layer 130 is a counter electrode 130. The counter electrode 130 provides substantially improved a memory characteristics, response speed and reliability of the electrochromic device 1 according to an exemplary embodiment.

The carbon nano-structured electrode layer 130 may be produced, e.g., manufactured, by a low-temperature process performed at about 300 degrees Celsius (° C.) or lower. In an exemplary embodiment, the carbon nano-structured electrode layer 130 is formed at about 150° C. or below, and an ease of fabrication of the electrochromic device 1 employing a flexible substrate is substantially improved. In a conventional device, a metal layer, such as Zinc (Zn), that may be reversibly oxidized or, alternatively, a conductive polymer layer that may be oxidized/reduced is used to form the counter electrode 130. In addition, an antimony-doped tin oxide ("$SnO_2ATO$") is used to form the counter electrode 130. However, the metal layer (or the conductive polymer layer) in the conventional device has a low visible light transmission, and is therefore not favorable for forming a transmissive-type or reflective-type display device. Moreover, the ATO layer has a dark blue optical color and is prepared using a high-temperature process, e.g., a process at a temperature greater than 450° C., and is therefore impractical for forming a flexible substrate.

In contrast, the carbon nano-structured electrode layer 130 according to an exemplary embodiment is formed at a relatively low-temperature process and printing process, as described above, and does not require a reflective layer to be formed inside an electrolyte layer 180. Accordingly, a production cost of the electrochromic device 1 according to an exemplary embodiment is substantially reduced. In an exemplary embodiment, the carbon nano-structured electrode layer 130 is transparent, porous and has substantially improved visible light transmission, and an electrolyte of the electrolyte layer 180 moves easily to thereby secure a substantially improved chromic response speed characteristic. Pores of the porous carbon nano-structured electrode layer 130 may be any of a variety of shapes, such as a linear shape, a curved line shape, a cylindrical shape, a spherical shape, a stick shape and amorphous shapes, for example. In an exemplary embodiment, the carbon nano-structured electrode layer 130 has porosity from about 10 volume percent (volume %) to about 90 volume % with respect to the carbon nano-structured electrode layer 130. Within the abovementioned porosity range, the carbon nano-structured electrode layer 130 efficiently functions as the counter electrode 130. Also, as the porosity increases within the above-mentioned range, the electrolyte 180 efficiently passes light and a surface area substantially increases. Thus, a memory characteristic and chromic speed are further substantially improved in the electrochromic device 1 according to an exemplary embodiment.

A transmittance, e.g., a transmittance rate, of the carbon nano-structured electrode layer 130 may be about 50 percent (%) or greater. A transmittance of about 80% or greater further substantially improves the chromic efficiency and transparency. As a result, a visual recognition characteristic of electrochromic device 1 according to an exemplary embodiment is substantially improved.

In an exemplary embodiment, a thickness of the carbon nano-structured electrode layer 130 may be from about 20 angstroms (Å) to about 2000 Å. Within the above-mentioned thickness range, the carbon nano-structured electrode layer 130 has substantially improved transmittance and optical memory characteristics. In addition, as the thickness of the carbon nano-structured electrode layer 130 increases within the above-mentioned thickness range, a capacitance from a content of a material forming the carbon nano-structured electrode layer 130 substantially increases.

Additionally, the carbon nano-structured electrode layer 130 according to an exemplary embodiment may be coated with a polymer layer to substantially improve adhesion between layers thereof.

A second substrate 210 of the electrochromic device 1 according to an exemplary embodiment may include glass, a metal film such as stainless steel ("SUS"), or plastics, for example. The plastics include, for example, transparent plastics such as polyethylene terephthalate, polyethylene naphthalate, polycarbonate, polyethersulfone, polyimide and/or glass fiber reinforced plastics, but alternative exemplary embodiments are not limited thereto.

A second electrode 220 is disposed on the second substrate 210. The second electrode 220 includes a metal electrode and an inorganic and/or an organic conductive material. In an exemplary embodiment, the second electrode 220 is transparent. The inorganic material includes, for example, ITO, IZO and/or fluorine-doped tin oxide, and the organic material includes polythiophene or phenylpolyacetylene, for example.

The second electrode 220 may be disposed over an entire surface of the second substrate 210 or, alternatively, the second electrode 220 may be patterned, as shown in FIG. 1. More specifically, patterns of the second electrode 220 may overlap a red portion 230R, a green portion 230G and/or a blue portion 230B of an electrochromic layer 230. In an exemplary embodiment, the red portion 230R, the green portion 230G and the blue portion 230B correspond to one pixel.

The electrochromic layer 230 is disposed on the second electrode 220. In addition, the electrochromic layer 230 may be divided into the red portion 230R, the green portion 230G and the blue portion 230B, as shown in FIG. 1. The electrochromic layer 230 may, however, include different colors than red, green and blue, and may, in an alternative exemplary embodiment, display one, two or some other number of colors. Further, kinds and numbers of colors of the electrochromic layer 230 may be diverse and alternative exemplary embodiments are not limited to the foregoing description or the exemplary embodiment shown in FIG. 1.

The electrochromic material may be an inorganic material or, alternatively, an organic material. The inorganic material may include, for example, tungsten oxide, molybdenum oxide and iridium oxide, while the organic material may include, for example, viologen, a pyridine-based compound, an aminoquinone-based compound, a rare earth element compound, phthalocyanine, a ruthenium-based compound, a leuco dye-based compound or a polymer-based electrochromic material, while alternative exemplary embodiments are not limited thereto. In an alternative exemplary embodiment, one or more of the above-listed materials may be mixed and used as the electrochromic material.

The electrochromic layer 230 according to an exemplary embodiment includes the electrochromic material and nano-particles, e.g., nano-particles supporting and/or supported by and/or with the electrochromic material. In an exemplary embodiment, the nano-particles may include, for example, a semiconductor such as titanium dioxide ($TiO_2$), zinc oxide ($ZnO_2$) and tungsten oxide ($WO_3$), but alternative exemplary embodiments are not limited thereto. Also, a shape of the nano-particles may include a spherical shape, a regular tetrahedral shape, a cylindrical shape, a triangular shape, a disk shape, a tripod shape, a tetrapod shape, a cubic shape, a box shape, a star shape and a tube shape, for example. A size of the nano-particles may be from about 1 nanometer (nm) to about 100 nm. Since the nano-particles provide an increased surface area, more electrochromic material may be utilized in the electrochromic device 1 according to an exemplary embodiment. The increased amount of the applied electrochromic material substantially improves a driving efficiency the electrochromic device 1.

In alternative an exemplary embodiment, the electrochromic layer 230 may include a polymer, e.g., a polymer compound, and an electrochromic material. The polymer compound includes, for example, polyvinyl pyrrolidone, polyvinyl butylal and polyvinyl alcohol. In an exemplary embodiment, about 1 weight percent (wt %) to about 50 wt % of the polymer compound may be mixed with about 1 wt % to about 50 wt % of the electrochromic material, but alternative exemplary embodiments are not limited thereto.

The electrolyte layer 180 is interposed between the first electrode 120 and the second electrode 220, and the electrolyte layer 180 is surrounded by a sealant 190, as shown in FIG. 1.

In an exemplary embodiment, the electrolyte layer 180 may include, for example, a solution obtained by dissolving an electrolyte salt, such as lithium salt, potassium salt, sodium salt and/or ammonium salt, in an aqueous solvent or, alternatively, a non-aqueous organic solvent. More than one salt may be mixed and used. The non-aqueous solvent may include carbonates, alcohols and ethers, for example. Examples of the non-aqueous solvent include ionic organic solvents of methylene carbonate, ethylene carbonate, propylene carbonate, ethylmethyl carbonate, γ-butyrolactone, ethylene glycol, polyethylene glycol, and imidazolium-based ionic liquid, but alternative exemplary embodiments are not limited thereto.

An operation principle of the electrochromic device 1 according to an exemplary embodiment will now be described in further detail with reference to FIG. 1.

In an exemplary embodiment wherein the electrochromic material includes viologen, when an electric field is not applied to the first electrode 120, the red, green and blue portions 230R, 230G and 230B, respectively, e.g., red, green and blue electrochromic materials 230R, 230G and 230B, are all transparent. Thus, all white light, incident to the first electrode 120, penetrates through the first electrode 120 to thereby display transparent white on the electrochromic device 1. In addition, when a white reflective layer (not shown) is further included inside or, alternatively, outside the electrochromic device 1, the white light that has penetrated through the first electrode 120 is reflected from the reflective layer, and an opaque white color having high reflectivity is displayed.

When an electric field is applied to the first electrode 120, electrons (or holes) are supplied to the red, green and blue electrochromic materials 230R, 230G and 230B, respectively, and colors of the electrochromic materials 230R, 230G and 230B are developed. For example, in a case in which the green electrochromic material 230G is supplied with the electrons (or the holes), green light is emitted and light of wavelengths other than the wavelength of the green light are all absorbed. Moreover, when the white reflective layer is further included outside the electrochromic device 1, the green light emitted from the electrochromic device 1 is reflected from the reflective layer, and the green light may be recognized along one direction from the electrochromic device 1. Accordingly, a chromic efficiency of the electrochromic device 1 according to an exemplary embodiment is thereby substantially improved.

In an exemplary embodiment, a driving voltage of the electrochromic device 1 may be from about 0.5 volts (V) to about 5.0 V.

In addition, when an ionization energy of the carbon nano-structured electrode layer 130 is controlled, the driving voltage of the electrochromic device 1, as well as a capacitance of the carbon nano-electrode, may be adjusted. For example, the ionization energy may be adjusted using a method of fabricating a carbon nano-electrode structure lacking electrons, e.g., carbon nanotubes lacking electrons (such as p-doped carbon nanotubes) or, alternatively, by a method of fabricating a carbon nano-electrode structure abundant with electrons, e.g., carbon nanotubes abundant with electrons (such as n-doped carbon nanotubes).

The method of fabricating carbon nanotubes lacking electrons (e.g., the p-doped carbon nanotube) includes a method of controlling electron density through a treatment of an oxidizing agent, a method of introducing an organic material including an electron withdrawing group and a method of controlling electron density with organic charge transfer molecules.

On the other hand, the method of fabricating carbon nanotubes abundant with electrons (e.g., the n-doped carbon nanotube) includes a high-temperature heat treatment method or a reducing agent treatment method, and a method of introducing an organic material having an electron donating group.

When the p-doped carbon nanotubes are used as the counter electrode 130, the driving voltage of a chromic material tends to increase (as the ionization energy increases) and the image memory characteristic tends to decrease due to a resulting decrease in capacitance. In the case of the n-doped carbon nanotubes, however, the image memory characteristic tends to increase, since the ionization energy decreases and the driving voltage of the electrochromic material slightly decreases with increased capacitance.

An exemplary embodiment of a method for fabricating an electrochromic device will now be described in further detail with reference to FIG. 1. Any repetitive detailed description described above will hereinafter be omitted.

In an exemplary embodiment, a first electrode 120 is formed on a first substrate 110. The first electrode 120 may be formed through a solution process such as a deposition process or a spin coating process, but alternative exemplary embodiments are not limited thereto.

A carbon nano-structured electrode layer 130 is formed on the first electrode 120. The carbon nano-structured electrode layer 130 may be formed by applying a solution including a carbon nano-structured electrode material through a spray coating process or a spin coating process, for example. In an exemplary embodiment, the carbon nano-structured electrode layer 130 is formed using a low-temperature process performed at about 250° C. or lower, as described in further detail above. In addition, in an exemplary embodiment wherein the carbon nano-structured electrode layer 130 is formed at a temperature lower than about 150° C., an ease and efficiency of fabrication of an electrochromic device 1 using a flexible substrate are substantially improved.

A second electrode 220 is formed on a second substrate 210 disposed opposite to, e.g., facing, the first substrate 110. The second electrode 220 may be formed through a solution process such as a deposition process or a spin coating process, for example. When the second electrode 220 is patterned, as described above, a photolithography process may be used, but alternative exemplary embodiments are not limited thereto.

An electrochromic layer 230 is formed on the second electrode 220. When the electrochromic layer 230 includes nano-particles, the nano-particles are supported with red, green and blue electrochromic materials 230R, 230G and 230B, respectively, and the electrochromic layer 230 is formed on the second electrode 220 through a spray coating process or a spin coating process, for example.

A sealant 190, including an injection hole formed therein (not shown), is formed on the first electrode 120 and/or the second electrode 220.

The first substrate 110, including the carbon nano-structured electrode layer 130 and the second substrate 210 with the electrochromic layer 230, are arrayed, e.g., are arranged in an appropriate order, and are assembled.

In an exemplary embodiment, the electrochromic device 1 is fabricated by, for example, injecting a material for forming an electrolyte layer 180 through the injection hole and thereafter sealing the injection hole.

The following examples illustrate exemplary embodiments of the present invention in further detail. However, it will be understood that alternative exemplary embodiments are not limited by the following examples.

To make Preparation Example, 1, 40 milligrams (mg) of a 50% polyacrylic acid solution, 20 mg of a carbon nanotube electrode material and 30 milliliters (ml) of distilled water are mixed and dispersed using an ultrasonic wave homogenizer. A weight ratio of the polyacrylic acid to the carbon nano-electrode structure is 1:1. A carbon nano-structured electrode solution is prepared by using a centrifugal separator at 10,000 rotations/revolutions per minute (rpm) for 10 minutes.

To make Preparation Example 2, 1 mg of graphene (e.g., expanded graphite), 100 mg of sodium dodecyl sulfate and 100 ml of distilled water are mixed and dispersed using an ultrasonic wave homogenizer. The mixture is separated using a centrifugal separator at 5000 rpm for 10 minutes to prepare a carbon nano-structured electrode solution. After formation of a layer in the carbon nano-structured electrode solution, the resulting layer is rinsed with water for about 5 minutes to remove any excessive dispersing agent.

For Example 1, an electrode is formed on a 3 centimeter (cm)×3 cm transparent plastic substrate and coated with 0.031 ml of the carbon nano-structured electrode solution prepared according to Preparation Example 1 (above) using a spraying method. A carbon nano-structured electrode layer is formed as a counter electrode 130 by rinsing and drying the electrode.

An electrode is formed on another transparent plastic substrate, and an electrochromic layer including $TiO_2$ nano-particles having an average diameter of about 25 nm are supported with viologen, which is a blue electrochromic material, is formed thereon. The drying temperature of the electrochromic layer is 450° C.

Subsequently, a sealant is formed around a circumference of the substrate. The two plastic substrates are assembled, and 0.1 molar (M) $LiCO_4$ and γ-butyrolactone are injected as an electrolyte. The substrate assembly is sealed with a sealant to fabricate Example 1 of an electrochromic device according to an exemplary embodiment.

For Example, 2, an electrochromic device according to an exemplary embodiment is fabricated according to the process described above for Example 1, except that 0.059 ml of the carbon nano-structured electrode solution, prepared according to Preparation Example 1 is used.

For Example 3, an electrochromic device according to an exemplary embodiment is fabricated according to the process described above for Example 1, except that 0.090 ml of the carbon nano-structured electrode solution prepared according to Preparation Example 1 is used.

For example 4, an electrochromic device according to an exemplary embodiment is fabricated according to the process described above for Example 1, except that 0.118 ml of the carbon nano-structured electrode solution prepared according to Preparation Example 1 is used.

For Example 5, an electrochromic device according to an exemplary embodiment is fabricated according to the process described above for Example 1, except that 1.783 ml of the carbon nano-structured electrode solution prepared according to Preparation Example 2 is used.

For Example 6, an electrochromic device according to an exemplary embodiment is fabricated according to the process described above for Example 1, except that 3.343 ml of the carbon nano-structured electrode solution prepared according to Preparation Example 2 is used.

For Example 7, an electrochromic device according to an exemplary embodiment is fabricated according to the process described above for Example 1, except that 6.687 ml of the carbon nano-structured electrode solution prepared according to Preparation Example 2 is used.

For Comparative Example 1, a conventional electrochromic device is fabricated according to the process described above for Example 1, except that a counter electrode having a layer thickness of about 1 micrometer (μm) is fabricated using an antimony-doped tin oxide solution, which is a product of the Mijitec Company, and a reflective layer is formed using $TiO_2$ having an average particle diameter of about 150 nm on the counter electrode.

To measure transmittance and memory characteristics of the above-listed Examples, an electric field is applied to the electrochromic devices according to Examples 1 through 7 and Comparative Example 1, and respective transmittances thereof are measured at 550 nm. In addition, after the electric field is applied the electrochromic devices, application of the electric field is stopped and the electrochromic devices are left in the atmosphere. Thereafter, memory characteristics of the electrochromic devices are measured by measuring an elapsed time for which the transmission rate at 550 nm is maintained. Results of the measurements described above are shown in Table 1 below.

TABLE 1

|  | Transmission Rate (%) | Memory Characteristic (min) |
|---|---|---|
| Example 1 | 94.4 | 15 |
| Example 2 | 90.7 | 20 |
| Example 3 | 86.2 | 25 |
| Example 4 | 82.5 | 30 |
| Example 5 | 90 | 30 |
| Example 6 | 85 | 60 |
| Example 7 | 81 | 90 |
| Comparative Example 1 | 45 | 60 |

As shown in Table 1, each of the electrochromic devices using a carbon nano-structured electrode layer according to exemplary embodiments of Examples 1 through 7 have excellent transmission rates, as well as excellent and/or sufficient memory characteristics, e.g., substantially improved transmission rate and memory characteristics, as compared to the conventional electrochromic device of Comparative Example 1.

Figure 2A:
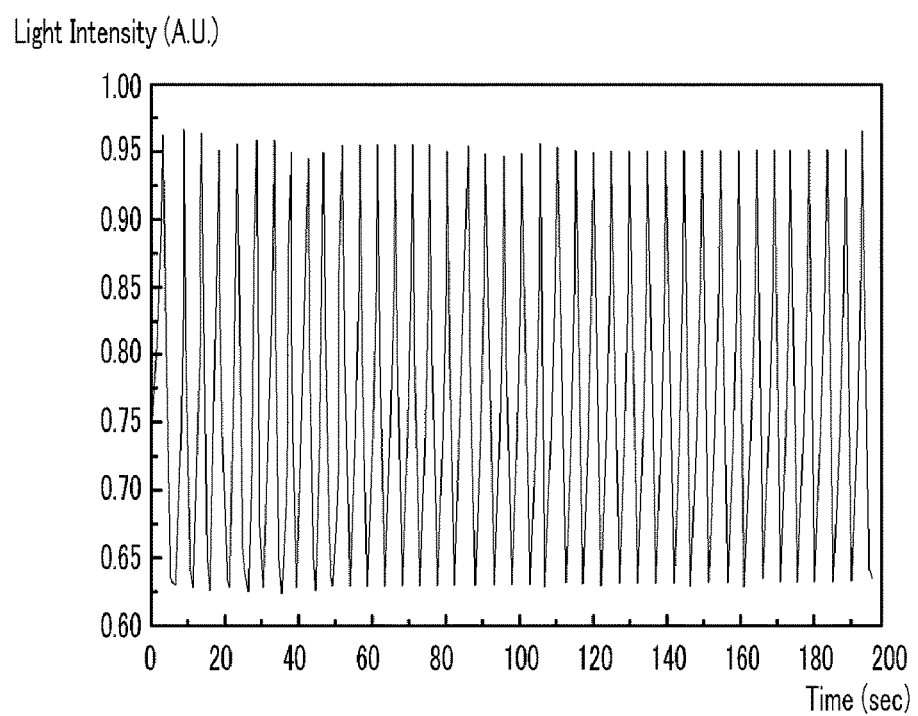
FIGS. 2A and 2B are graphs of light intensity versus time illustrating a reliability of an exemplary embodiment of an electrochromic device in accordance with Example 1.
Figure 2B:
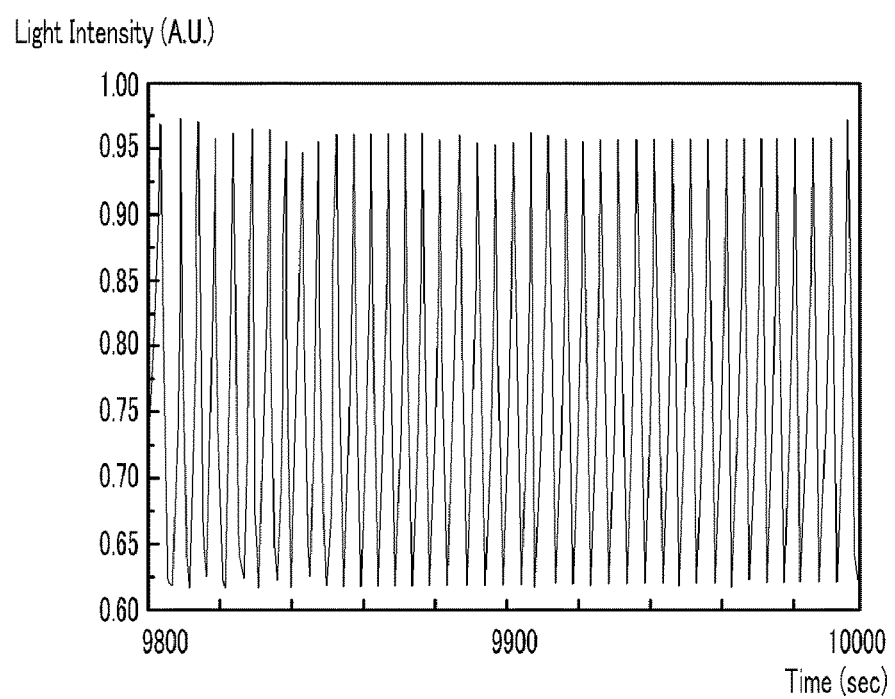

FIGS. 2A and 2B are graphs of light intensity versus time illustrating a reliability of an exemplary embodiment of an electrochromic device according to Example 1. More particularly, results of repeatedly driving the electrochromic device according to the exemplary embodiment fabricated according to Example 1 (to determine a reliability thereof) are shown in FIGS. 2A and 2B. As shown in FIGS. 2A and 2B, there is little or no change in optical characteristics of the electrochromic device according to an exemplary embodiment, even though the electrochromic device is driven over more than 10,000 cycles.

Figure 3:
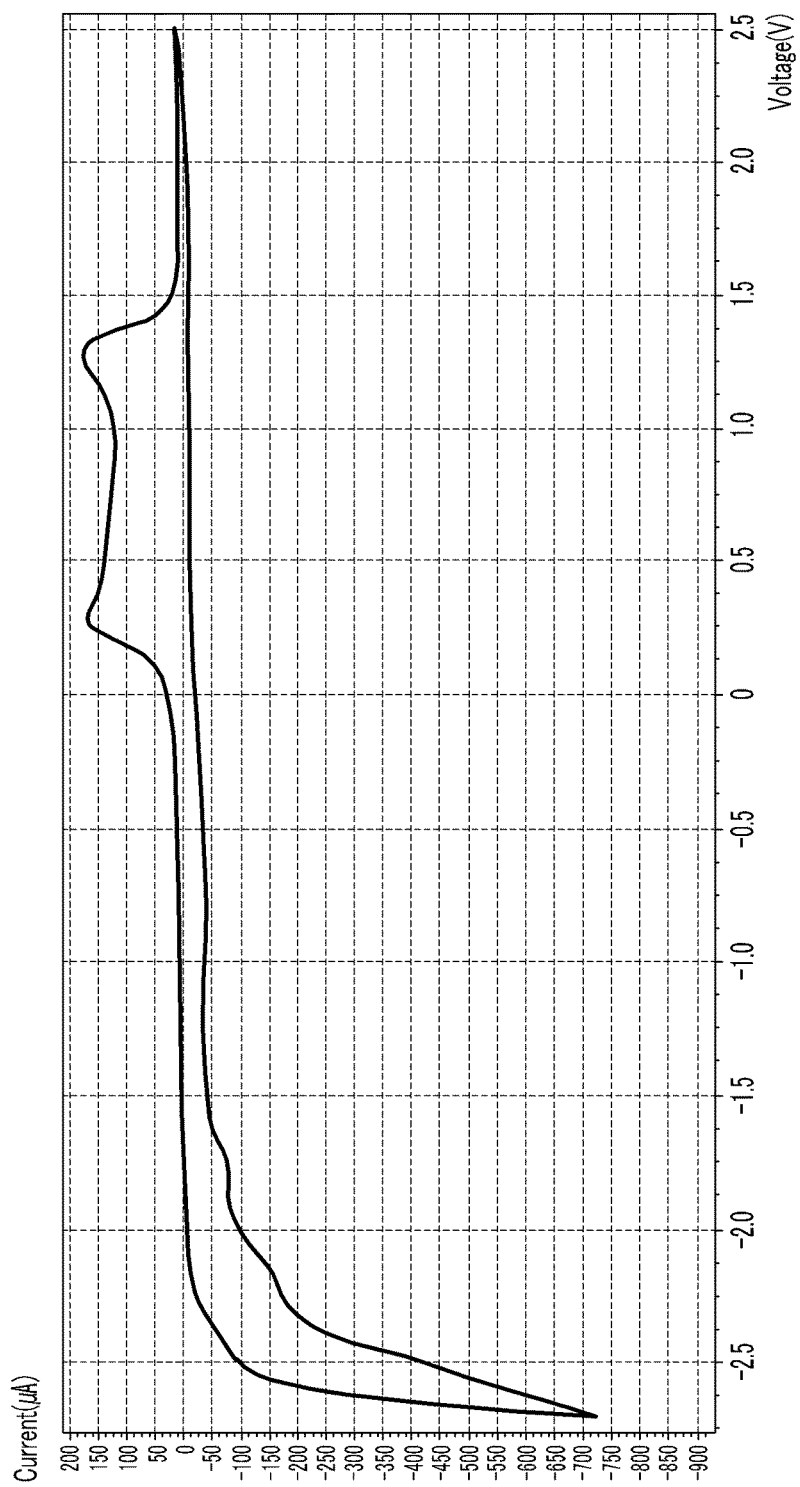
FIGS. 3 and 4 are graphs of current versus voltage illustrating current-voltage relationships of the exemplary embodiment of an electrochromic device in accordance with Example 1 and an electrochromic device in accordance with Comparative Example 1.
Figure 4:
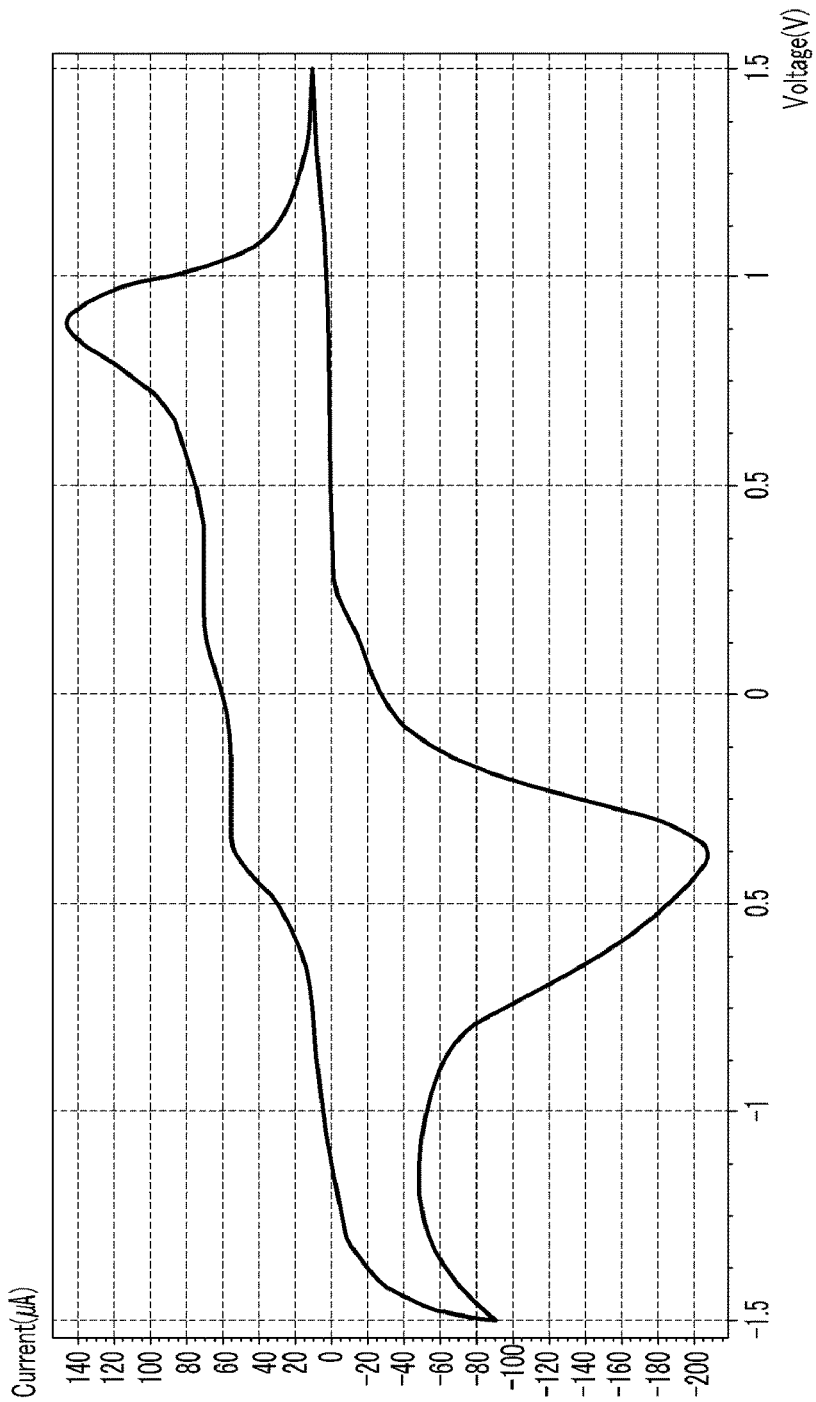

FIGS. 3 and 4 are graphs of current versus voltage illustrating current-voltage relationships of the exemplary embodiment of an electrochromic device according to Example 1 and an electrochromic device according to Comparative Example 1. More particularly, current-voltage graphs of the electrochromic device according to an exemplary embodiment fabricated according to Example 1 and the conventional electrochromic device according to Comparative Example 1 are measured and results thereof are shown in FIGS. 3 and 4, respectively. As shown in FIGS. 3 and 4, the driving voltage of the electrochromic device according to the exemplary embodiment fabricated according to Example 1 is about 2.5 V, while the driving voltage of the conventional electrochromic device fabricated according to Comparative Example 1 is only about 1.5 V.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described herein with reference to exemplary embodiments thereof, it will be understood by those of ordinary skill in the art that various changes in form and details may be made therein without departing from the spirit or scope of the present invention as defined by the following claims.

What is claimed is:

1. An electrochromic device, comprising:
a first substrate;
a second substrate disposed opposite the first substrate;
a first electrode disposed on the first substrate;
a second electrode disposed on the second substrate, the second electrode comprising a plurality of portions separated from each other and corresponding to different color portions of a pixel;
an electrochromic layer disposed on the second electrode;
an electrolyte layer interposed between the first substrate and the second substrate,
further comprising a carbon nano-structured electrode layer on the first electrode; and
a counter electrode disposed on the first electrode, the counter electrode consisting essentially of the carbon nano-structured electrode layer and excluding $TiO_2$.

2. The electrochromic device of claim 1, wherein the carbon nano-structured electrode layer includes at least one selected from a group consisting of carbon nanotubes, graphene and any mixtures thereof.

3. The electrochromic device of claim 1, wherein a transmission rate of the carbon nano-structured electrode layer is about 50 percent or greater.

4. The electrochromic device of claim 1, wherein a porosity of the carbon nano-structured electrode layer is from about 10 volume percent to about 90 volume percent.

5. The electrochromic device of claim 1, wherein a thickness of the carbon nano-structured electrode layer is about 20 angstroms to about 2000 angstroms.

6. The electrochromic device of claim 1, wherein a driving voltage of the electrochromic device is from about 0.5 volts to about 5.0 volts.

7. The electrochromic device of claim 6, wherein the driving voltage is adjusted by controlling an ionization energy of the carbon nano-structured electrode layer.

8. The electrochromic device of claim 1, wherein the electrochromic layer comprises one of an electrochromic material disposed in a nano-structure and a mixture including an electrochromic material and a polymer compound.

9. The electrochromic device of claim 8, wherein the nanostructure comprises nano-particles having a size from about 1 nanometer to about 100 nanometers.

10. The electrochromic device of claim 1, wherein the second electrode comprises patterns corresponding to portions of a pixel.

11. The electrochromic device of claim 1, wherein the carbon nano-structured electrode layer is transparent.

12. A method for fabricating an electrochromic device, the method comprising:
forming a first electrode, and forming a second electrode disposed opposite the first electrode,
further forming a carbon nano-structured electrode layer as a counter electrode, on the first electrode;
forming an electrochromic layer on the second electrode; and
forming an electrolyte layer between the first electrode and the second electrode,
wherein
the second electrode comprises a plurality of portions separated from each other and corresponding to different color portions of a pixel;
the counter electrode consists essentially of the carbon nano-structured electrode layer and excludes $TiO_2$; and
the carbon nano-structured electrode layer is completely formed at a temperature of about 150 degrees Celsius or less.

13. The method of claim 12, wherein a transmission rate of the carbon nano-structured electrode layer is about 50 percent or greater.

14. The method of claim 12, further comprising:
arraying the first electrode and the second electrode; and
assembling the first electrode and the second electrode.

15. The method of claim 12, wherein
the carbon nano-structured electrode layer is transparent,
a porosity of the carbon nano-structured electrode layer is from about 10 volume percent to about 90 volume percent, and
a thickness of the carbon nano-structured electrode layer is from about 20 angstroms to about 2000 angstroms.

16. The method of claim 12, further comprising forming a counter electrode on the first electrode, the counter electrode including the carbon nano-structured electrode layer.

17. The electrochromic device of claim 12, further comprising adjusting a driving voltage of the electrochromic device such that the driving voltage is from about 0.5 volts to about 5.0 volts.

18. An electrochromic device, comprising:
a first substrate;
a second substrate disposed opposite the first substrate;
a first electrode disposed on the first substrate;
a second electrode disposed on the second substrate, the second electrode comprising a plurality of portions separated from each other and corresponding to different color portions of a pixel;
an electrochromic layer disposed on the second electrode;
an electrolyte layer interposed between the first substrate and the second substrate,
further comprising a carbon nano-structured electrode layer on the first electrode; and
a counter electrode disposed on the first electrode, the counter electrode consisting essentially of the carbon nano-structured electrode layer.

* * * * *